United States Patent Office 3,804,959
Patented Apr. 16, 1974

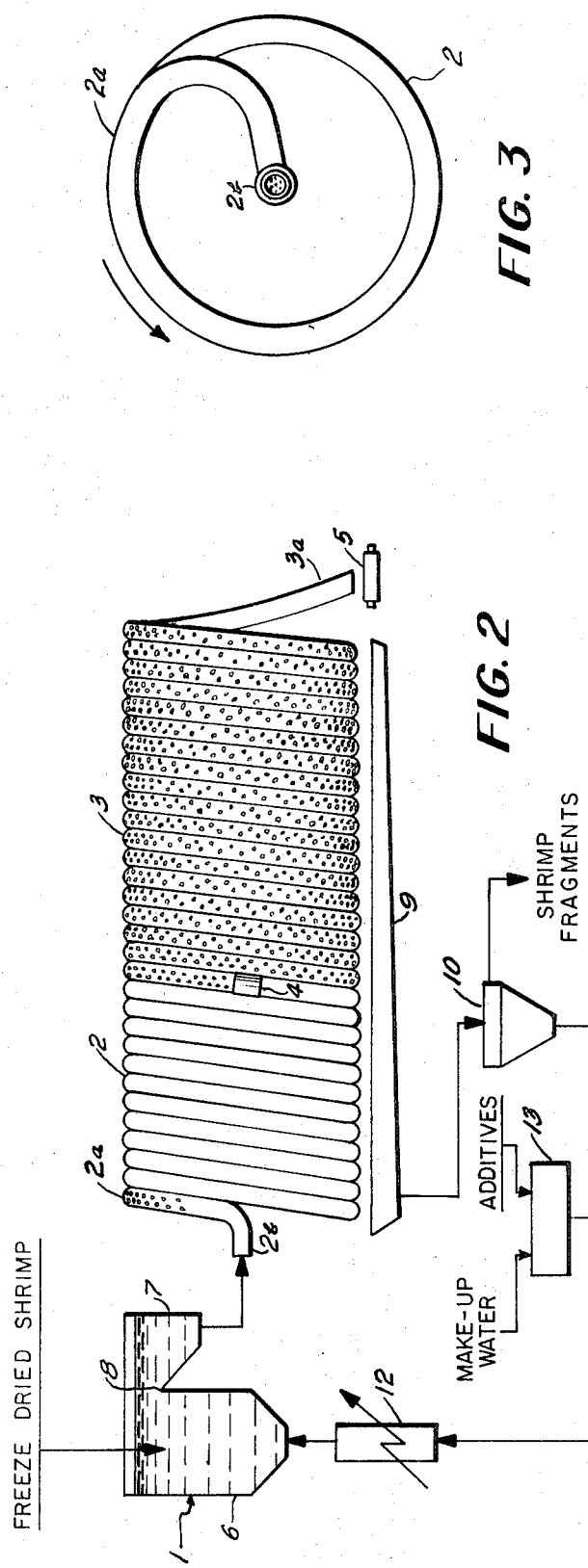
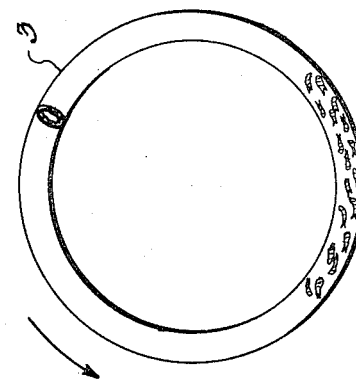
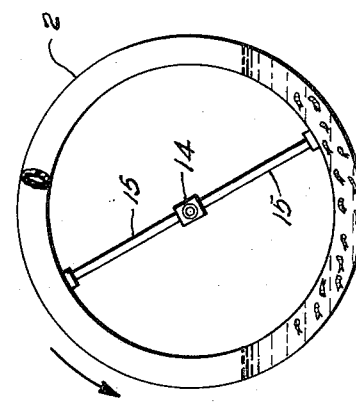
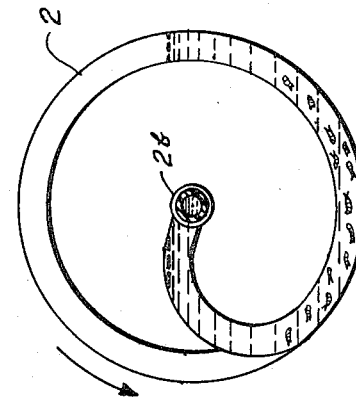

3,804,959
METHOD FOR REHYDRATING DRIED FOODSTUFFS
William H. Stevenson III, Winston-Salem, N.C., assignor to Ocean Trove Development Corp., Washington, D.C.
Filed June 8, 1971, Ser. No. 151,062
Int. Cl. A22c 29/00; A23l 1/33
U.S. Cl. 426—376      21 Claims

ABSTRACT OF THE DISCLOSURE

Dried foodstuffs, particularly dried shrimp, are rehydrated by maintaining the foodstuff immersed in an aqueous liquid rehydration medium while passing the same through a rehydration zone to saturate the foodstuff with the aqueous liquid, recovering the saturated foodstuff from the liquid, and then maintaining the foodstuff under controlled conditions to effect equilibration. The method lends itself to continuous operation and, particularly in the case of dried shrimp, provides a rehydrated product organoleptically similar to the fresh product.

RELATED APPLICATION

Apparatus features disclosed herein are described and claimed in my copending application Ser. No. 151,063, filed June 8, 1971.

BACKGROUND OF THE INVENTION

The growing tendency for demand for foodstuffs to exceed local or nearby supplies, and the high shipping costs for fresh and frozen foodstuffs, have promoted commercial interest in the concept of harvesting foodstuffs in areas remote from the intended market, drying the product, shipping the dried and therefore lighter product to the market area, and rehydrating the product just prior to distribution. As an example, the demand for shrimp in the United States has expanded until most of the shrimp available in nearby waters are being harvested. Much of the total present harvest is shipped to the market area in frozen state and thawed at the consumer's location. Handling of frozen shrimp is feasible when the shrimp are harvested relatively near the distribution area, and shrimp consumed in the United States is presently harvested throughout the Gulf of Mexico, frozen, and shipped in frozen condition to the particular market area. Even with harvesting in such relatively near areas, however, shipping and processing costs have increased excessively, due in part to the cost of shipping the water content of the frozen product and of maintaining the product under refrigeration. Finally, the shrimp available in nearby waters is becoming inadequate to supply the demand, so that more distant harvest areas, such as the West Coast of Africa, the Philippines, and the Far East must be considered despite the high cost of shipping from such areas.

It has long been known that foodstuffs such as shrimp can be freeze dried, then kept safely without refrigeration, and reconstituted for use by rehydration. Much work has been done on drying methods and equipment, and freeze drying, or drying by other methods, is generally recognized as commercially practical when the cost of drying can be accepted. To date, however, prior-art workers have provided no way in which commercial quantities of, e.g., freeze dried shrimp, could be rehydrated at reasonable cost and with the product being equivalent to or superior to that now available in the market. Though investigations have been carried out with respect to rehydration of the small quantities required by a household, for example, such work has not resulted in methods applicable to commercial scale, bulk rehydration.

OBJECTS OF THE INVENTION

A general object of the invention is to provide a method for rehydrating large quantities of dried foodstuffs, especially freeze dried shrimp, economically and with adequate through-puts to make it practical to handle foodstuffs harvested and dried abroad and shipped in dried form to the ultimate market area.

Another object is to devise a continuous method for rehydrating dried foodstuffs.

A further object is to devise a method for rehydrating freeze dried shrimp in a fashion such that the rehydrated product is organoleptically similar to fresh shrimp.

Yet another object is to provide a continuous rehydrating method in which an amount of the dried material is combined with a liquid rehydration medium and the resulting liquid/solids quantity is passed through a rehydration zone in such fashion that the quantity is gently agitated or stirred.

A still further object is to provide such a method whereby better penetration of the rehydration liquid into the dried product is achieved.

Another object is to devise a continuous method by which dried foodstuffs are rehydrated by initially saturating the dried material with an aqueous liquid, recovering the foodstuff from the residual liquid, and then maintaining the recovered foodstuff under controlled conditions to accomplish at least partial equilibration.

SUMMARY OF THE INVENTION

The dried foodstuff, at a moisture content not exceeding 5% by weight, is combined with an aqueous liquid rehydration medium in proportions providing an amount of liquid substantially in excess of that which can be taken up by the dried material. The liquid medium and dried material are passed through a rehydration zone, with a residence time of 2–40 minutes and with the liquid at a temperature of from the lowest temperature at which it remains liquid to not more than 90° F. with the result that the foodstuff is saturated with the liquid. The material is discharged from the rehydration zone and the foodstuff recovered from the residual liquid. The material so recovered is then maintained at a temperature of from just above the freezing point of the liquid to 40° F. for a period of time to accomplish at least partial equilibration, that is, transfer of the liquid from the extra-cellular voids of the foodstuff into and through the tissue thereof.

In particularly advantageous embodiments of the invention, especially adapted for rehydration of freeze dried shrimp, predetermined quantities of the dried shrimp and water are combined into a discrete quantity having a liquid-to-solids volume ratio of at least 1:1, and successive such quantities are passed through the rehydration zone without comingling of the quantities, each such quantity being exposed directly to a retaining wall having a smooth surface while relative movement is accomplished between that surface and the wall, so that, as it passes through the rehydration zone, the quantity is mildly agitated, with the shrimp moving within the liquid. Advantageously, the dried shrimp is evacuated when immersed in the liquid, and each quantity of liquid and shrimp is further subjected to reduced pressure, while within the rehydration zone, to accomplish degassing in the presence of the liquid.

In order that the manner in which the foregoing and other objects are achieved according to the invention can be understood in detail, particularly advantageous embodiments thereof will be described with reference to the accompanying drawings, which form part of the original disclosure of this application, and wherein:

FIG. 2 is a diagrammatic illustration of one form of apparatus, with which the method can be practiced; and FIGS. 3-3C are semidiagrammatic views illustrating the manner in which a quantity of rehydration liquid and shrimp is advanced through treatment zones established by the apparatus of FIG. 2.

GENERAL DESCRIPTION OF THE METHOD

Figure 1:
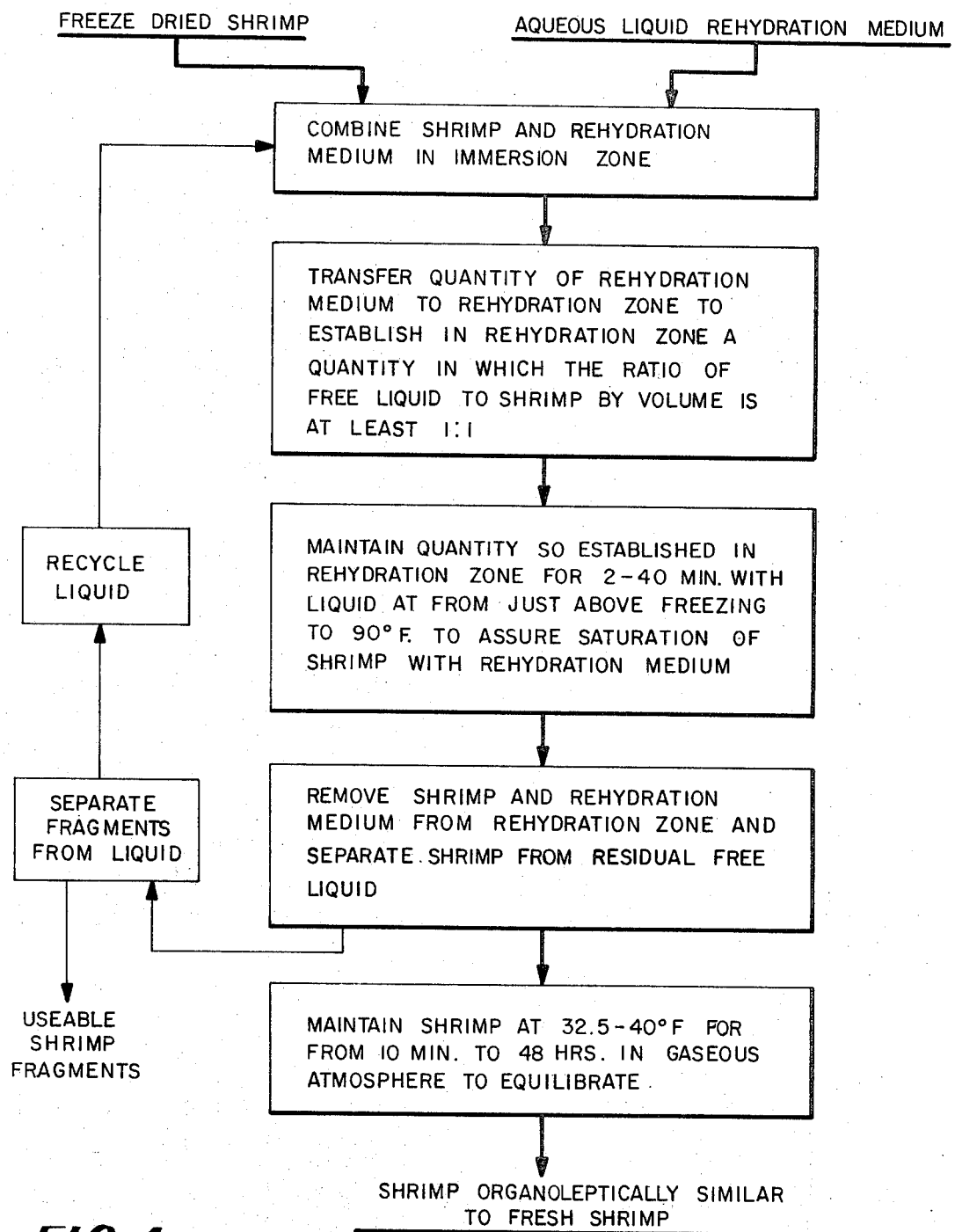
FIG. 1 is a flow diagram illustrating the method as applied to freeze dried shrimp.

The method is carried out by immersing the dried foodstuff in an aqueous liquid rehydration medium, then maintaining a quantity of the liquid and foodstuff in a rehydration zone for a time adequate to saturate the foodstuff with the liquid, recovering the saturated foodstuff and freeing it of residual free liquid, and then maintaining the foodstuff under controlled conditions to accomplish equilibration.

The method is broadly applicable to rehydration of any foodstuff which has been dried to an available water content low enough, i.e., not exceeding 5% by weight, to assure safe storage without (or with minimal) refrigeration, and which is in the form of pieces which can be immersed in the rehydration medium and will be essentially independent, one from another, when so immersed. The term "available water" is used to mean water present in such form as to be free for reaction to cause degeneration of the foodstuff, and excludes water which is so bound, chemically or physically, as to be unavailable for reactions leading to degradation. The term "pieces" is used to include a whole object, e.g., a berry or a deheaded shrimp, as well as pieces into which such objects have been cut. The size of the piece is ordinarily controlled by the nature of the foodstuff and the limitations inherent in the particular drying method, and the method is operative for the broad range of foodstuffs dried in pieces as that term is here employed.

The invention is most successful when the dried foodstuff is in a form such that rehydration is all that is required to render the product salable. Thus, preliminary processing steps should ordinarily be done prior to drying. In the case of shrimp, the shrimp should in all events be shelled, deheaded and deveined prior to drying and, advantageously, should also be cooked before drying so that the rehydrated product can be delivered directly to the retail market.

To achieve optimum rehydration according to the method, the foodstuff should be prepared and dried under conditions causing a minimum of shrinkage and structural damage to the foodstuff. In the case of shrimp, it is advantageous to cook the same at lower temperatures, e.g., below 200° F., and to dry the cooked shrimp by conventional freeze drying procedures so chosen as to result in a shrinkage not exceeding 18% and, advantageously, not exceeding 12%, and with the freeze dried product having a rehydration ratio (rehydrated weight: dry weight, with rehydration by soaking unagitated in water at 40° F., for 30 min.) of at least 3.5. Freeze dried shrimp so prepared is capable of taking up, during rehydration, at least 90% of the water removed by drying, and it is advantageous to have the shrimp capable of taking up at least 95% of the water removed by drying.

The invention finds its greatest economic advantage, and its greatest usefulness in providing a rehydrated product organoleptically similar to the fresh foodstuff, when employed to rehydrate freeze dried shrimp of all varieties, including all shrimp from salt, brackish or fresh waters, and to rehydrate freeze dried lobster and crayfish. In the case of smaller shellfish such as shrimp, the dry product should be the whole shelled, deheaded, deveined animal. In the case of larger shellfish, such as lobsters, the starting material is normally in the form of cut pieces.

The rehydration medium is chosen to return to the tissue of the dried foodstuff water in substantially the form contained in the fresh product. Accordingly, ions not present in the water content of the fresh foodstuff should be minimized or avoided. When the foodstuff being rehydrated is shrimp, the rehydration medium should be water essentially free of sulfur, copper and iron. The rehydration medium can contain minor proportions of additives effective to restore the foodstuff to approximately fresh condition, to aid in penetration of water into the dried material, to compensate for loss of volatiles, such as flavor constituents, during cooking and drying, and to control the pH of the medium. For rehydrating freeze dried shrimp, the rehydration medium can comprise deionized water containing, e.g., 0-3% by weight monosodium glutamate, for flavor enhancement and texture improvement, 0-20% sugar, and 0-30% sodium chloride. The pH of the rehydration medium is adjusted to 3.0-5.5 by addition of food grade acid, typically hydrochloric acid or phosphoric acid.

The dried foodstuff is immersed in a quantity of the liquid rehydration medium which is markedly in excess of the amount of the liquid which can be taken up by the dried material, and a quantity of the liquid and foodstuff is then maintained in a rehydration zone for a period of time adequate to cause the foodstuff to become saturated with the liquid. Since a large proportion of the liquid ultimately taken up by the foodstuff is taken up immediately on immersion, it is advantageous to accomplish initial immersion in a zone separate from the rehydration zone, with the immersion zone containing a large excess of rehydration liquid, and then to transfer some of the rehydration liquid and all of the immersed foodstuff to the rehydration zone to establish therein a quantity in which the ratio of liquid to foodstuff by volume is at least 1:1. Such quantity is then maintained in the rehydration zone for a time adequate to allow the foodstuff to become saturated with the rehydration liquid. In the case of dried shrimp, and assuming that the shrimp is immersed from 0.25-5 min. before entering the rehydration zone, the residence time of the shrimp in the rehydration zone can be 2-40 min.

At all times during which the foodstuff is immersed in the rehydration liquid, the liquid is maintained at a temperature in the range of from the lowest temperature at which the medium remains liquid to 90° F. In the case of dried shrimp, particularly good results are achieved with the rehydration medium at 35-50° F., with the narrower range of 38-41° F. being optimum.

To aid in saturation of the dried material with the liquid rehydration medium, it is advantageous to have the dried material as free as possible of gases during saturation in the rehydration zone. Thus, saturation is accomplished more effectively if the dried foodstuff has been evacuated prior to immersion in the rehydration medium, and this can be accomplished, e.g., by vacuum packing the dried material for shipment from the location where it is dried to the location where it is to be rehydrated, and accomplishing the immersion step by opening the evacuated package, e.g., a bag or can, while the same is immersed in the rehydration liquid. Alternatively, rather than pre-evacuating the dried material, evacuation can be accomplished by subjecting the body of rehydration liquid in which the foodstuff is immersed to a reduced pressure, i.e., a vacuum of at least 20 in. Hg, to degas the dried material while immersed. The method is most effective when at least part of the degassing of the dried material is accomplished while the same is immersed in the rehydration liquid, both because some residual gas is present after pre-evacuation to that extent normal for vacuum packing, and because degassing in the presence of the rehydration liquid, with attendant flexing of the tissue structure of the foodstuff, aids in entry of the liquid into the foodstuff. Degassing of the foodstuff while immersed in the rehydration liquid can also be accomplished by subjecting the combined quantity of liquid and foodstuff to sonic energy at lower frequencies, i.e., 20-400 kc./sec., in conventional fashions employed for degassing liquids, with the precise frequency depending upon the particular dried material and the design parameters of the equipment containing the combined quantity of liquid and foodstuff at the time of degassing.

When the time period of saturation is complete, the combined quantity of now-saturated foodstuff and residual free liquid rehydration medium is removed from the rehydration zone and residual free liquid is removed from the saturated foodstuff. At this stage, the foodstuff contains rehydration liquid in voids external to the tissue, as well as liquid which has been taken up by the tissue from the voids. The capacity of the tissue to take up the liquid is as yet unsatisfied. On the other hand, the quantity of liquid in the voids is in excess of that which can be taken up by the tissue. In this condition, the foodstuff, though successfully saturated, does not have the same, or approximately the same, organoleptic characteristics as did the fresh or cooked foodstuff prior to drying. In particular, the texture, chewability and mouth feel will be different and, ordinarily, observably inferior. As an example, when the foodstuff is freeze dried, cooked shrimp, the freshly saturated shrimp will tend to be "mushy" and it is possible to squeeze out free liquid.

To overcome these deficiencies, the saturated foodstuff is maintained at 32.5–40° F. for from 10 min. to 48 hrs., advantageously in air or a gaseous atmosphere, to allow the saturated product to equilibrate. During equilibration, a major proportion of the rehydration liquid in the voids external to the tissue of the foodstuff migrates into the tissue itself, achieving by absorption, adsorption and perhaps other transfer phenomena a disposition approximating that obtained in the fresh or fresh cooked material. Equilibration is gradual and results in a generally corresponding improvement in texture, chewability and mouth feel of the rehydrated product. While attaining optimum, if not complete, equilibration is desirable, even partial equilibration can provide a product equal to, or even superior to, products now available commercially, such as shrimp and like foodstuffs which have been maintained frozen for prolonged periods and thawed prior to use.

It is advantageous to carry out the method in such fashion that all or a portion of the 10 min.–48 hr. equilibration period is achieved at the rehydration location. Alternatively, a portion or even all of the equilibration period can be achieved during shipping and handling of the rehydrated product between the point of rehydration and the point of retail sale. In either case, it is advantageous to subject the rehydrated product to a dewatering step at the location at which rehydration is carried out, with the extent of dewatering being determined to achieve a free moisture content not exceeding 10% by weight, and preferably in the range of 5–7%, after equilibration, "free moisture" being used to refer to the liquid remaining in the voids external to the tissue. Accordingly, after removal from the rehydration zone, the saturated material and liquid can be passed through a second zone in which excess liquid is removed by drainage, can then be held for all or a portion of the equilibration period, and can then be positively dewatered, as by centrifuging or by acoustic vibration. Alternatively, when part or all of the equilibration is to be accomplished during refrigerated transportation and storage, the dewatering step can be carried out immediately after removal, e.g., by centrifuging or by passing the material through a perforated conduit equipped with an acoustic vibrator. Following this alternative, the amount of free moisture removed is adjusted to a lower value to allow for the further transfer of liquid from the voids to the tissue during the contemplated refrigeration and storage, the amount of such adjustment depending upon the equilibration accomplished before dewatering, the particular foodstuff involved, and the total extent of equilibration intended.

TYPICAL CONTINUOUS EMBODIMENT

The method of the invention has special advantages when carried out in continuous fashion, with independent combined quantities of dried foodstuff and rehydration liquid passed through successive zones including at least a rehydration zone, in which the foodstuff is saturated with rehydration liquid, and a second zone, in which the residual liquid is removed to render the saturated material ready for equilibration. Such continuous embodiments of the invention will be described with reference to FIGS. 2–3C, which show semidiagrammatically a typical apparatus capable of use in carrying out the method.

As seen in FIG. 2, the apparatus includes a tank 1, defining a liquid-containing immersion zone, and two serially connected helically extending conduits 2 and 3 which define, respectively, a rehydration zone, in which saturation of the foodstuff with the rehydration liquid is accomplished, and a second zone in which the foodstuff is at least rehydrated. The first half convolution 2a of conduit 2 is perforated. All of conduit 3 is perforated. The two conduits, interconnected by coupling 4, are disposed in a helical configuration of constant diameter, the helix being mounted in any suitable fashion for rotation about its longitudinal central axis. The inlet end portion 2b of conduit 2 is disposed as a straight portion coaxial with the longitudinal axis. The output end 3a of conduit 3 is disposed above an off-bearing conveyor 5.

Tank 1 includes a main portion 6 and a feed portion 7. The side walls of the tank project upwardly above portions 6 and 7 to define a space communicating with both tanks. A weir 8 is interposed between portions 6 and 7. A drain opening in the bottom of portion 7 communicates with inlet end portion 2b of conduit 2.

A receiving trough 9 is disposed below conduits 2 and 3 and extends for the complete length of the helix, so as to collect all liquid draining from the first half convolution of conduit 2 and the convolutions of conduit 3. Trough 9 has a drain from which the collected liquid is passed through a centrifuge 10, pump 11, and heat exchanger 12 to an entrance at the bottom of tank portion 6, so that the excess rehydration liquid can be recycled at a constant rate determined by operation of pump 11. A make-up tank 13 is provided to supply make-up water and additives.

Tank 1, connected as described, is employed to supply a predetermined quantity of rehydration liquid and foodstuff to input portion 2b of conduit 2 automatically once during each revolution of the helix of the conduits. The first half convolution 2a rotates toward its uppermost position, as shown in FIG. 3, while rehydration liquid is supplied continuously to tank portion 6. So long as the first half convolution 2a is above the axis of rotation of the helix, liquid can drain from tank portion 7 only at a low rate allowed by such perforations in half convolution 2a as are below the level of liquid in tank portion 7, and that rate is small compared to the rate of liquid flow afforded by pump 11. While the first half convolution 2a is traversing the upper half of its circular travel, the dried foodstuff, in the amount required for one combined quantity of liquid and foodstuff, is immersed in the liquid in tank 1 and disposed in the liquid accumulating above weir 8. Typically, a vacuum packed container (or containers) containing the required quantity of dried foodstuff is opened while submerged in the liquid in tank portion 6, and the pieces of foodstuff thus released into the liquid are positively elevated to at least the weir level, as by a buoyant follower screen. As the first half convolution 2a of conduit 2 swings into the lower portion of its circular travel, all of the liquid and foodstuff contained in tank portion 7 and in tank 1 above weir 8 is drained into the first half convolution 2a, as illustrated in FIG. 3A. To assure positive transfer from tank 1 to conduit 2, the combined volume of tank portion 7 and the portion of tank 1 filled above weir 8 is made greater than the volume of that portion of the first half convolution 2a to be filled, the perforations in first half convolution 2a being provided in size and number adequate to allow the excess liquid to drain into trough 9, for recycle to tank 1, with such drainage occurring while the liquid and foodstuff remain in the first half convolution.

The helix of conduits 2 and 3 is rotated continuously and such rotation effects a helical pumping action which causes the combined quantity of rehydration liquid and foodstuff which has been introduced into the first half convolution 2a to progress continuously along the helix of conduit 2. Since each revolution of the helix causes one combined quantity of liquid and foodstuff to be established in the first half convolution 2a, all of the helical convolutions of conduit 2 will contain such a combined quantity, as will be clear from FIG. 3B, and each such combined quantity will progress to the output end of conduit 2 and be discharged, by the same helical pumping action above described, into conduit 3. Thus, each combined quantity of liquid and foodstuff is maintained as an isolated discrete quantity from the time it is established in the first half convolution 2a until it is discharged from conduit 2 into conduit 3.

The amount of rehydration liquid remaining in the combined quantity after draining away the excess liquid in the first half convolution 2a is the predetermined amount required to give the desired volume ratio of rehydration liquid to foodstuff, i.e., at least 1:1. Since a substantial amount of rehydration liquid will have been taken up by the dried foodstuff as soon as the same is immersed in the liquid in tank 1, the volume of liquid in the combined quantity established in convolutions of conduit 2 is markedly greater than that which can be taken up by the foodstuff, and the combined quantities therefore remain freely flowable throughout their residence time in conduit 2.

Conduit 2 thus defines a rehydration zone in which saturation of the foodstuff with the rehydration liquid is completed. The residence time of all combined quantities of liquid and foodstuff traversing the rehydration zone is essentially constant, being predetermined by the number of convolutions of the helix of conduit 2 and the speed of rotation thereof. The quantity of foodstuff which can be included in each combined quantity is determined by the volume of tank 1, the inner diameter of conduit 2 and the diameter of the helix.

Conduit 2 is, e.g., of polymeric material and has a smooth inner surface. The convolutions of the helix of conduit 2 rotate relative to the combined quantities of liquid and foodstuff, and the smooth wall of the conduit therefore moves continuously past each quantity, causing the liquid of the quantity to circulate within the liquid body and causing the pieces of foodstuff to move within the body of liquid, so that the combined quantity is gently agitated throughout its residence time in the rehydration zone, with part of that agitation being caused by direct, gentle engagement between the moving wall of the conduit and the foodstuff pieces carried by the liquid. Such agitation tends to maintain the foodstuff pieces distributed through the liquid, and provides maximum exposure of the surfaces of the pieces to the liquid.

Even when the dried foodstuff is vacuum packed and immersed in the rehydration liquid without being exposed to air or other gas, there is a small but significant residual gas content in the foodstuff immersed in the liquid. And at least some degassing during saturation of the foodstuff is desirable in all events because it aids in entry of the liquid into the foodstuff. It is accordingly advantageous to expose each combined quantity of rehydration liquid and foodstuff to a reduced pressure during the residence time of the quantity in the rehydration zone defined by conduit 2. This can be accomplished by evacuating one or more of the intermediate convolutions of conduit 2. As seen in FIG. 3B, for example, a suction conduit 14 connected to a suitable vacuum pump (not shown) is connected to diametrically opposed points, within each convolution to be evacuated, via conduits 15. The vacuum pump is operated to provide a vacuum within the respective convolution of at least 20 in. Hg, this evacuation affecting only the portion of the convolution not containing the combined quantity of liquid and foodstuff. Such evacuation causes the gas retained in the pieces of foodstuff to be withdrawn into the liquid and thence into the empty portion of the convolution. Since such degassing is accomplished while the pieces of foodstuff are immersed in the liquid, direct migration of the rehydration liquid into the locations within the piece from which the gas was evacuated is promoted.

When the convolution (or convolutions) of conduit 2 which is evacuated is preceded by a substantial number of convolutions not directly connected to the vacuum line and are followed by a substantial number of such convolutions and when, as in the apparatus just described, the end convolutions of the conduit communicate with the atmosphere, the pressures in the convolutions preceding the evacuated convolution decrease progressively, convolution-by-convolution, until the degassing condition is reached in the evacuated convolution. Conversely, the pressures in the convolutions following the evacuated convolution increase progressively until atmospheric pressure is again attained. Thus, each combined quantity of liquid and foodstuff passed through the conduit 2 is subjected first to gradually decreasing pressures and then to gradually increasing pressures, so that abrupt changes in pressure are avoided.

Assuming that all convolutions of conduit 2 contain a combined quantity of liquid and foodstuff pieces, then each revolution of the helical assembly of conduits 2 and 3 causes one such combined quantity to progress from the last convolution of conduit 2 into the first convolution of conduit 3 since, insofar as the helical pumping or conveying action is concerned, conduit 3 constitutes an extension of conduit 2. Since conduit 3 is perforated, all of the residual rehydration liquid of each quantity drains into receiving trough 9 for recycle to tank 1, leaving the now-saturated foodstuff pieces of the quantity in the conduit. Thus, the first 1–3 convolutions of conduit 3 can be considered as defining an initial dewatering zone. Though the residual liquid of each combined quantity is thus removed, the saturated foodstuff pieces, being relatively small in comparison to the diameter of the conduit, continue to be advanced, convolution-by-convolution, until discharged as a discrete foodstuff quantity via discharge end 3a onto offbearing conveyor 5. The relatively slow rate of lineal travel of the wall of conduit 3 relative to the foodstuff pieces causes only a gentle rubbing and tumbling of the pieces, so that the pieces survive with no significant physical damage.

With the first convolutions of conduit 3 defining a dewatering zone, the remaining convolutions of conduit 3 can be considered as defining an equilibrating zone. The residence time of the foodstuff pieces in the equilibrating zone can be predetermined by the number of convolutions of conduit 3 provided, and the speed of rotation of the helical assembly. In most cases, temperature of the foodstuff pieces in the equilibration zone defined by conduit 3 can be controlled by proper selection of the temperature of the liquid in tank 1, that temperature being established by heat exchanger 12, and by maintaining a reasonably low ambient temperature in the location of the apparatus, though additional refrigeration can be employed when longer residence times are employed.

While the amount of dewatering accomplished in the zones established by conduit 3 is adequate for numerous applications of the method, it is advantageous to subject the pieces of foodstuff to a more forcible and positive dewatering action, to reduce the free moisture content to not more than 10% by weight, and such dewatering is best accomplished after the foodstuff has been allowed to equilibrate significantly. Thus, the foodstuff can be delivered by conveyor 5 to a centrifuge operated to accomplish the desired positive dewatering.

SPECIFIC EMBODIMENT OF THE METHOD APPLIED TO FREEZE DRIED SHRIMP

Assume tank 1 has an effective capacity, i.e., the volume of portion 7 plus the volume filled above the level of weir 8, of 2.1 cu. ft., that the inner diameter of conduits 2, 3 is 6 in., and that the mean diameter of the helix defined by the two conduits, i.e., the diameter from the center of the conduit to the center of the conduit, is 6 ft. Assume further that conduit 2 extends through 12 convolutions of the helix, that conduit 3 extends through 18 convultions, and that the helical assembly is rotated at ½ r.p.m. Assume that slightly less than ½ of the total volume afforded by the first convolution of the helix of conduit 2, e.g., 1.8 cu. ft., will be filled with liquid and shrimp during each revolution of the helical assembly.

Shrimp which has been peeled, deheaded, deveined, cooked at 190° F., freeze dried to a moisture content below 2% by weight, and vacuum packed in gas-impervious bags at a distant location is presented at the location of the rehydration apparatus, after shipment, with each bag containing 25 lb. of dried shrimp and with the shrimp having a rehydration ratio, as hereinbefore defined, of approximately 4, the shrinkage resulting from freeze drying being less than 12%. With the helical assembly of conduits 2 and 3 rotating continuously, two of the 25 lb. bags of dried shrimp are opened, while immersed in the rehydration liquid in portion 6 of tank 1, during the portion of each revolution of the helical assembly when the first half convolution 2a is in the upper portion of its circular travel so that no liquid is flowing from tank portion 7 through inlet portion 2b. The flow of rehydration liquid into tank portion 6 via heat exchanger 12 is controlled to provide a total of 2.1 cu. ft. of combined rehydration liquid and shrimp in the portion of tank 1 to be drained, i.e., portion 7 plus the filled space above the level of weir 8, so that, considering only the combined quantity of liquid and shrimp to be drained from the tank as first convolution 2a descends into its lower half revolution, the volume ratio of rehydration liquid to shrimp is approximately 2.6:1. The actual volume to be filled being 1.8 cu. ft., the size and number of the perforations in the first half convolution 2a are so selected that the excess liquid (.3 cu. ft.) is drained off into trough 9 while the combined quantity of liquid and shrimp is still in the first half convolution 2a. Accordingly, as the combined quantity of rehydration liquid and shrimp advances into the lower half of the second convolution, and thereafter in conduit 2, the volume ratio of liquid to shrimp is approximately 2:1.

The rehydration liquid is deionized water, with or without 1.5% by weight monosodium glutamate, 5% by weight sugar, and 10% salt, with the pH adjusted to 4.8 by addition of food grade hydrochloric acid, the additives being introduced in make-up tank 13. Heat exchanger 12 is operated to maintain the rehydration liquid at 37–38° F. as it enters tank portion 6, so that a temperature of 39–40° F. is maintained in tank 1 and at least the first few convolutions of conduit 2.

Each combined quantity of rehydration liquid and shrimp persists until discharged into conduit 3, so that the residence time of each quantity in the rehydration zone defined by conduit 2 is 24 min. Since the dried shrimp is initially immersed in the liquid in tank 1 for a portion of the 2-minute period required for each revolution of the helical assembly, a major proportion, e.g., 80–95%, of the aqueous medium to be taken up by the shrimp is taken up before the shrimp enters the conduit 2, the residence time of the shrimp in conduit 2 being adequate to assure that the shrimp is completely saturated with the rehydration liquid before being discharged into conduit 3. To further assure complete saturation, at least one intermediate convolution of conduit 2 is placed under a reduced pressure of, e.g., 24 in. Hg, as hereinbefore described with reference to FIG. 3B, so that residual gasses are removed from the shrimp while the shrimp is immersed in the rehydration liquid.

When the combined quantities of liquid and shrimp are discharged into conduit 3 via connector 4, the free liquid is immediately drained, via the perforations in conduit 3, into trough 9. The remaining saturated shrimp advances through conduit 3, with traces of free water draining into trough 9, and with the saturated shrimp remaining at a temperature not significantly exceeding 40° F. The residence time of the saturated shrimp in conduit 3 is 36 min., at the end of which period the shrimp is discharged onto conveyor 5 for delivery either to the point of sale to the consumer or to refrigerated storage.

The rehydrated shrimp thus provided are organoleptically similar to fresh shrimp and organoleptically superior to the usual shrimp of commerce which have been block frozen, shipped, and thawed. While superiority of shrimp rehydrated according to the invention is attributable to a number of factors, a particularly important attainment of the method is complete saturation, followed by a controlled equilibration period in which water taken initially into the extra-cellular voids of the shrimp is transferred to and distributed through the tissue of the shrimp.

All of the liquid drained from conduits 2 and 3 is recycled from trough 9 back to tank 1. During recycle, centrifuge 10 serves not only to clarify the liquid but also to recover the small but significant quantity of shrimp fragments or particles separated from the shrimp proper during its travel through tank 1 and conduit 2. Though some of such particles have not been completely saturated, they will have achieved a major part, e.g., 90% of total saturation and constitute a valuable by-product ready, for example, to be prepared into shrimp cakes.

A particular advantage of the invention lies in the fact that the method can be practiced in continuous fashion, at practical through-put rates, without requiring unduly expensive equipment. Thus, in the specific example given, 1500 lbs. of dry shrimp is processed per hour, with an hourly yield of approximately 6000 lbs. of rehydrated shrimp.

What is claimed is:

1. A method for providing shrimp in a form organoleptically similar to fresh shrimp, comprising
providing dried shrimp from which the shells have been removed and in which the available water content does not exceed about 5% by weight;
continuously passing said dried shrimp through rehydration zone and there maintaining the shrimp immersed in an aqueous rehydration medium,
said aqueous medium being at a temperature in the range of from just above the freezing point of said aqueous medium, at the pressure conditions involved, to 90° F.,
the shrimp being maintained immersed in said aqueous medium in said zone for 2–40 minutes,
whereby water is introduced into the shrimp to at least substantially saturate the shrimp, at least a substantial portion of the water so introduced being situated in the extra-cellular voids of the shrimp;
continuously removing the saturated shrimp from said rehydration zone; and
then maintaining the shrimp at a temperature of 32.5–40° F. for from 10 minutes to 48 hours in a gaseous atmosphere, whereby a substantial portion of the water initially contained in the extra-cellular voids is transferred to and distributed through the tissue of the shrimp.

2. A method according to claim 1, wherein the shrimp is maintained immersed in said aqueous medium in said zone for 5–20 minutes.

3. A method according to claim 1, wherein said aqueous medium is maintained at 35–50° F.

4. A method according to claim 1 and further comprising evacuating the shrimp at a time prior to completion of said step of passing said shrimp through said rehydration zone.

5. A method according to claim 4, wherein said step of evacuating said shrimp is accomplished prior to immersing the shrimp in said aqueous medium, and the evacuated shrimp are immersed in said aqueous medium while said shrimp are in evacuated condition.

6. A method according to claim 4, wherein said step of evacuating said shrimp is accomplished while said shrimp are immersed in said aqueous medium.

7. A method according to claim 4, wherein said aqueous medium is maintained at 35–50° F.

8. A method according to claim 7, wherein said aqueous medium is maintained at approximately 40° F.

9. A method according to claim 1 and further comprising
continuously passing the saturated shrimp from said rehydration zone into and through a second zone; and
removing the free aqueous medium from said second zone,
the shrimp being thereafter maintained in air at atmospheric pressure while in said second zone,
the time period of residence of the shrimp in said second zone constituting at least part of said period of from 10 minutes to 48 hours.

10. A method according to claim 1, wherein
said dried shrimp are provided in sealed, evacuated, air-impervious containers,
the method further comprising
establishing a body of said aqueous rehydration medium;
immersing the containers in said body;
opening said containers while so immerse, whereby the dried shrimp are introduced into said aqueous medium without exposure to air; and
delivering the shrimp, immersed in said aqueous medium, into said rehydration zone.

11. A method according to claim 1, wherein the shrimp are maintained in a body of said aqueous medium in said rehydration zone and said body of aqueous medium is advanced progressively through said rehydration zone.

12. A method according to claim 1, wherein said aqueous medium is maintained at a pH of 3.0–5.5.

13. A method according to claim 1, wherein said aqueous medium contains in solution at least one water soluble edible flavor material.

14. A method according to claim 1, wherein said dried shrimp are shrimp which have been peeled, deheaded, deveined and cooked at a temperature below 200° F., said dried shrimp having an available moisture content not exceeding 2% by weight.

15. A method according to claim 14, wherein said rehydration medium is water containing in solution an amount of monosodium glutamate not exceeding 3% by weight, and an amount of sodium chloride not exceeding 30% by weight.

16. A method according to claim 15, wherein said rehydration medium also contains in solution an amount of sugar not exceeding 20% by weight.

17. A method according to claim 1, wherein said shrimp are combined with a quantity of said aqueous rehydration medium such that the volume ratio of liquid to shrimp in the combined quantity of liquid and shrimp is at least 1:1, and said step of passing the shrimp through the rehydration zone is carried out by passing said combined quantity through the rehydration zone while maintaining the combined quantity as an isolated discrete quantity.

18. A method for rehydrating shrimp which have been shelled, deheaded, deveined and freeze dried, comprising
establishing in a rehydrating zone a predetermined quantity of aqueous liquid rehydration medium containing a quantity of the shrimp such that the volume ratio of liquid to shrimp is at least 1:1;
continuously passing said quantity of rehydration medium and shrimp through the rehydration zone while maintaining the same as a discrete quantity,
the residence time of said quantity in the rehydration zone being 2–40 minutes,
the temperature of the rehydration medium of said quantity being in the range of from the lowest temperature at which the rehydration medium is liquid to 90° F.,
said quantity being maintained in contact with a smooth inert retaining surface which moves relative to said quantity during said residence time, whereby relative movement between the shrimp and the rehydration medium is provided during said residence time;
discharging said quantity from the rehydration zone;
recovering the shrimp from the rehydration medium of said quantity, and
maintaining the recovered shrimp at a temperature of 32.5–40° F. for at least 10 minutes in a gaseous atmosphere.

19. A method according to claim 18 and further comprising recovering shrimp fragments from the rehydration medium of said quantity; and recycling the rehydration medium for use in rehydrating additional shrimp.

20. A method for continuously rehydrating a dried foodstuff which is in the form of pieces which can be immersed in a rehydration medium and will be essentially independent, one from another, when so immersed, comprising
combining the dried foodstuff with an aqueous liquid rehydration medium in proportions such that the volume of said aqueous medium markedly exceeds that which can be taken up by the foodstuff;
continuously passing the resulting combined quantity of aqueous liquid medium and foodstuff through a rehydration zone while maintaining said combined quantity as an isolated discrete quantity at a temperature not exceeding 90° F.;
subjecting said combined quantity to a subatmospheric pressure of at least 20 inches of mercury and thereby causing gas to be evacuated from said foodstuff while said foodstuff is immersed in said aqueous medium;
recovering said foodstuff from said aqueous medium; and
maintaining said foodstuff at a temperature of 32.5–40° F. for at least 10 minutes in a gaseous atmosphere,
said combined quantity of aqueous medium and foodstuff being maintained in the rehydration zone for a period of time which is at least 2 minutes and which is adequate to allow the foodstuff to be at least substantially saturated with the aqueous medium,
said step of subjecting said combined quantity to a subatmospheric pressure being carried out while said combined quantity is in said rehydration zone.

21. A method according to claim 20, wherein said combined quantity is subjected first to a progressively decreasing pressure and then to a progressively increasing pressure as it passes through said rehydration zone.

References Cited
UNITED STATES PATENTS
3,462,281   8/1969   Macy _____ 99—209

RAYMOND N. JONES, Primary Examiner

U.S. Cl. X.R.

426—506